United States Patent [19]
Corkum et al.

[11] 3,786,762
[45] Jan. 22, 1974

[54] TRANSPORTATION SYSTEM ELECTRICAL POWER DISTRIBUTION

[75] Inventors: James L. Corkum, Enfield, Conn.; David Schoepflin, Newburyport, Mass.; Paul A. Taylor, East Hartford, Conn.

[73] Assignee: Alden Self-Transit Systems Corporation, Bedford, Mass.

[22] Filed: Mar. 5, 1971

[21] Appl. No.: 121,263

[52] U.S. Cl. .............. 104/148 R, 191/2, 191/29 R, 191/49, 191/59.1
[51] Int. Cl. ............................................. B60l 5/00
[58] Field of Search .. 191/49, 45 R, 45 A, 59.1, 35, 191/33, 29 R, 22 R, 23 R, 23 A, 66, 2, 63.2; 104/148 R, 244.1; 246/31

[56] References Cited
UNITED STATES PATENTS

| | | | |
|---|---|---|---|
| 3,124,226 | 3/1964 | Sprigings | 191/59.1 |
| 3,624,318 | 11/1971 | Rekers | 191/23 A |
| 3,337,697 | 8/1967 | Martin et al. | 191/23 R |
| 654,348 | 7/1900 | Johnson | 191/63.2 |
| 3,238,314 | 3/1966 | Faiveley | 191/66 |
| 769,214 | 9/1904 | Gaynor | 191/2 |
| 1,174,760 | 3/1916 | Philpott | 246/31 |
| 3,492,949 | 2/1970 | Brown | 104/244.1 |

FOREIGN PATENTS OR APPLICATIONS 1,090,706   10/1960   Germany .................... 191/66

Primary Examiner—Robert G. Sheridan
Assistant Examiner—George H. Libman
Attorney, Agent, or Firm—Willis M. Ertman

[57] ABSTRACT

A transportation system includes two power sources that extend along opposite sides of a right of way for an electrically powered vehicle. Each power source includes an elongated open side housing of electrically insulating material that defines a channel having opposed inner surfaces disposed at an angle to one another and tapering inwardly. A power conductor is disposed in each inner surface and a third power conductor is located at the innermost end of the channel substantially midway between the two inner surfaces. Each vehicle includes two power collector assemblies, each power collector assembly having a tapered head that carries three conductor members and is arranged for sliding engagement with the power source on its side of the vehicle.

21 Claims, 7 Drawing Figures

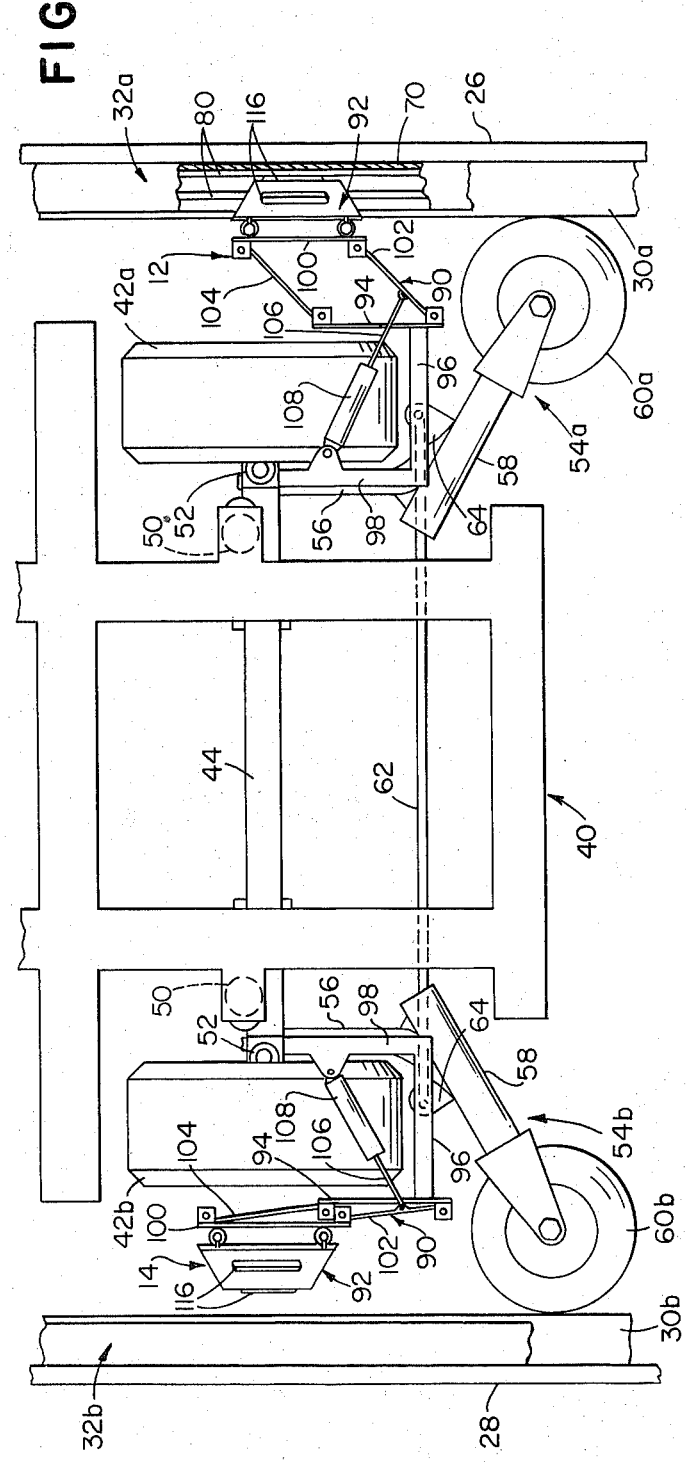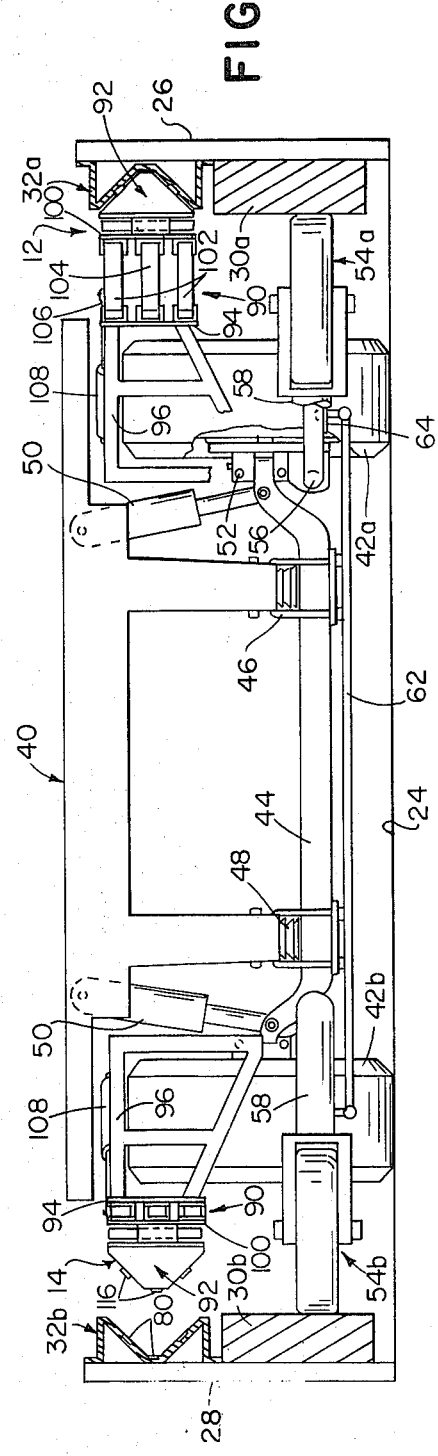

TRANSPORTATION SYSTEM ELECTRICAL POWER DISTRIBUTION

SUMMARY OF INVENTION

This invention relates to vehicles using electrical power from power sources external of the vehicle, and to transportation systems utilizing such vehicles.

It is frequently desired to supply electrical power to a moving device such as a vehicle from a fixed electrical power transmission system. Such a system is an individual vehicle commuter transportation system which includes an electrical distribution bus to supply electrical power to control and/or propel vehicles along a roadway system. A system of this type is described generally in U.S. Pat. No. 3,254,608. In such systems electrical power must be transmitted to the vehicle in a reliable manner. The application of power to the vehicle at a roadway junction must be facilitated. Also, the power supply arrangement should be economical, minimize the likelihood of harm to personnel, and be operable in a wide range of weather conditions.

An object of this invention is to provide novel and improved power supply systems for electrically powered vehicles, providing a safe and continuous external power source for rapid, efficient and non-hazardous vehicle movement.

Another object is to provide improved automated vehicle transportation systems, and vehicles therefor.

A further object of the invention is to provide a novel and improved power supply system for a transportation system that employs vehicles that have in-vehicle switching capability.

The invention features a transportation system in which vehicles powered by (or otherwise utilizing) electrical power follow a predetermined vehicle path. The system includes a power source extending along the vehicle path, and a power collector, electrically connectible to the power source for continuous power transfer, mounted through coupling structure to vehicle. The power source comprises structure defining a channel located to receive the power collector, which channel has opposed inside surfaces which taper inwardly of the channel, and power conductor structure exposed in this channel. The power collector head has outside surfaces which generally conform to the inside surfaces of the channel and power receiver structure exposed through the head. The power collector head is sized and structured to be received into sliding engagement with the power source channel with the power receiver structure in electrical contact with the power conductor structure. The coupling structure comprises retractor means for selectively inserting and retracting the power collector relative to the power source, so as to make or break electrical contact, and resilient coupling means constructed to permit relative movement of power receiver structure and power conductor structure during insertion of the power collector into the power source channel. The resultant self-aligning capabilities of the power source and power collector, provided by the matching configurations of the engaging head and channel, and the resilient cojpling provide efficient, rapid, and sure power switching.

In a preferred embodiment the power source is a single bus unit installed on either one side of the guideway or the other, except at junction points where two bus units are installed, one located along each side of the vehicle. The vehicle has two power collectors, one on each side, only one of which normally is engaged with a power source for vehicle propulsion or control. The two power sources diverge at a junction, the power collector engageable with the power source associated with the desired vehicle direction past the junction is readily engaged, to provide non-interrupted power transmission as the vehicle moves through the junction. Moreover, the grooved or recessed configuration of the power source has the further advantage that the exposed power-carrying conductors therein are sufficiently remotely located so as to minimize the risk of accidental contact, yet remain readily accessible for inspection and/or maintenance. Further safety is provided in a preferred embodiment by a flexible rubber insulating cover, shingled to exclude rain, snow, ice, etc. from the conductors. This cover automatically opens and closes as the power collector on the vehicle slides over the conductors. The cover will not support combustion and maintains its shape and flexibility over a temperature range of −45° to +165°F.

In a particular embodiment, the power source assembly includes a molded fiberglass structure having inner surfaces disposed at an angle of 90° to one another, thus defining a V-shaped groove. The power conductor structure for a three phase installation includes three parallel continuous conductors, spaced apart from one another by the electrical insulating material of the channel, with one conductor located in each of the aforesaid inner surfaces of the groove and the third located at the junction of the two inside surfaces, at the innermost end of the groove. The power collector has, correspondingly, power receiver structure in the form of three contact members, also spaced apart from one another by electrical insulating material, and located for simultaneous independent engagement with the respective conductors in the channel structure.

In a particular power collector construction, the contact members are spring biased in the head so as to have a contact surface protrude past the surrounding surfaces of the head. The coupling means includes spring structure between the retractor and the head to permit relative movement of the head in a direction perpendicular both to the predetermined vehicle path and to the general direction of retractor movement. For example, the head may be slidably secured relative to the retractor structure and also supported on resilient mountings to allow limited angular movement of the head.

A preferred retractor means includes a pantograph linkage having one side secured to the vehicle, the opposite side resiliently coupled to the power collector, arms joining these sides, and drive means, such as a piston, secured to at least one arm, for expanding and contracting the linkage. Where the vehicle has a power collector on each side, advantageously a separate drive piston is arranged to operate each retractor, although a single dual acting piston system could be arranged to operate both retractors simultaneously in opposite directions.

Other objects, features and advantages will appear to one skilled in the art from the following description of a preferred embodiment of the invention, taken together with the attached drawings thereof, in which:

FIG. 3 is a top elevational view of the forward end of the chassis of an electrically powered vehicle and associated power sources;

FIG. 4 is a front elevational view of the vehicle and power sources of FIG. 3, with a portion broken away to show the mounting of the power collector and guide follower assemblies;

DESCRIPTION OF PARTICULAR EMBODIMENT

Figure 1:
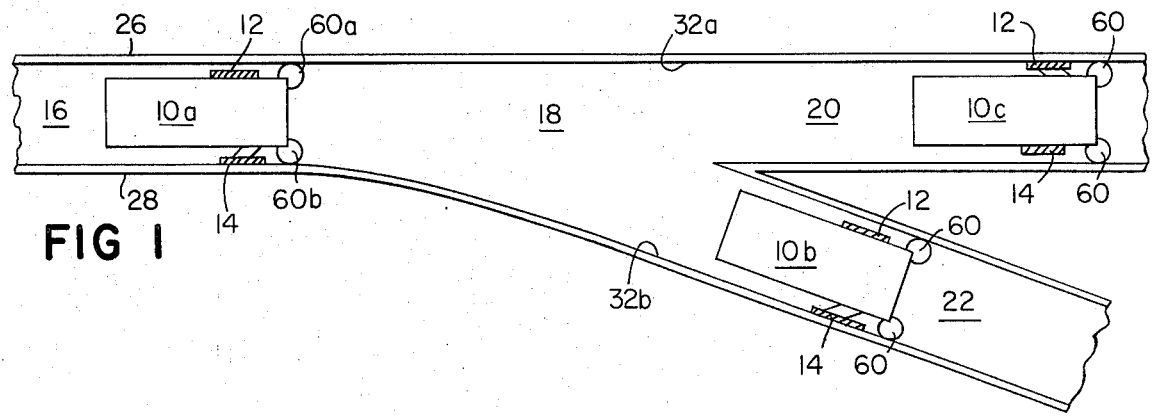
FIG. 1 is a schematic view of a junction-containing portion of an individual vehicle transportation system embodying the present invention.

FIG. 1 shows a portion of a system constructed in accordance with the present invention having vehicles 10 equipped with power collector systems 12, 14, and a path section 16 which separates at junction 18 into two path sections 20, 22. The invention might, for example, be employed in a travelling crane system, a commuter system, a system for transporting passengers between airport terminals, or moving baggage. In the illustrated system, each roadway has a smooth horizontal surface 24 (which may be paved with suitable asphalt material, for example, to increase the frictional coaction with the vehicle wheels that engage that surface) and, as indicated particularly in FIG. 4, two upstanding guide members 26, 28 for guide and safety purposes, disposed generally perpendicular to surface 24, each have a guide structure 30a, 30b and a power distributor structure 32a, 32b, respectively.

Referring now to FIGS. 3 and 4, each vehicle 10 has a chassis 40 on which are mounted foam-filled, rubber road tires 42, of which only the front two steerable tires 42a, 42b are shown in the figures. The rear tires would be typically driven by an electrically actuated drive system, such as that described in copending application Ser. No. 41,994, filed June 1, 1970 now U.S. Pat. No. 3,681,597 in the names of Morley et al., entitled "Transportation System" and assigned to the same assignee as this application. The front wheel assemblies are supported on axle 44 which is mounted on the vehicle frame 40 by a suitable resilient coupling such as brackets 46 and springs 48. Shock absorbers 50 are also secured between frame 40 and axle 44. At each end of the axle 44 is a conventional wheel support assembly 52 which allows the entire wheel structure to rotate about a vertical axis relative to the end of the axle 44. Follower structures 54a and 54b each include a connector strut 56, secured at one end to the corresponding wheel assembly and at its other end to cylinder 58. Each follower wheel 60a, 60b (inflated or foam-filled rubber) is rotatably secured to cylinder 58. A tie rod 62 is pivotally secured at its ends to web 64, and each web is secured to a corresponding strut 56.

The follower wheels 60 are thus steeringly connected to road tires 42, to provide a steering system such as disclosed in the assignee's copending application Ser. No. 41,954, filed June 1, 1970 now U.S. Pat. No. 3,643,601. In general, the steerable wheels are biased toward a selected one or the other of the guide members 30 in an invehicle switching arrangement so that the respective follower wheel engages that guide member, and the vehicle follows the direction of that guide member.

Figure 2:
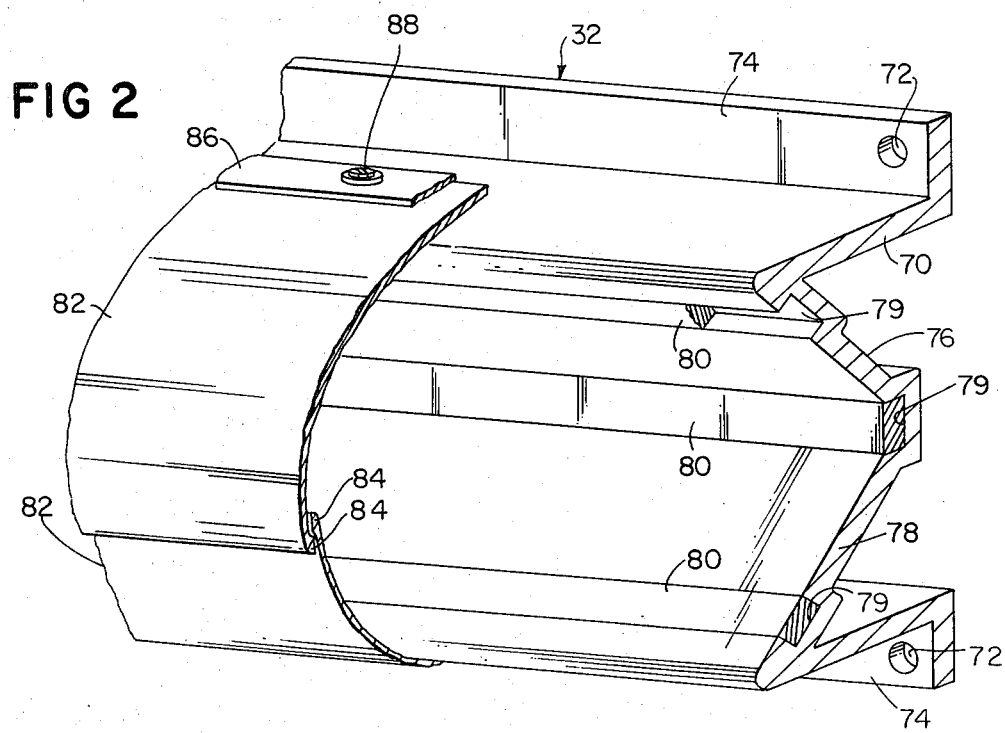
FIG. 2 is an isometric, somewhat diagrammatic view of a section of a power source employed in the system shown in FIG. 1.

Referring now to FIG. 2, each power rail structure 32 is in the form of a fixed continuous three-conductor busway which includes a support base 70, formed of a suitable electrical insulating material such as fiberglass or an extruded plastic that may have openings 72 disposed in its L-shaped end flanges 74 to receive appropriate fastenings for securing to the guide members 26, 28. The base has two planar wall sections 76, 78 (that define an inclined angle of 90°) between the two end flanges 74 forming a V-shaped channel which in a 220-volt three-phase AC system is about two inches deep and five inches wide and having three axially extending recesses 79 therein. A copper bus bar 80 (about ¼ inch × ¾ inch in cross-section) is secured in each recess 79 in the channel by suitable means such as countersunk bolts. The size of the bus bars are a function of factors such as system load and allowable voltage drop in a 575 volt AC system, for example bus bars of one square inch cross-section are employed. Although the illustrated three-phase AC system employs three conductors or bus bars, other bus bar configuration may be used in appropriate systems—e.g., a DC system would employ a two-bus bar arrangement (using one bus as ground). A pair of flexible sheets 82 of rubber or other suitable insulating material may be employed to provide a cover for the busways along their lengths except at switching points. The sheets are normally disposed in shingled configuration and include lips 84 which are engaged to maintain the shingle configuration. Clamp strips 86 and fasteners 88 secure the sheets 82 to support 70.

Each power collector assembly 12, 14 comprises a pantograph linkage support system 90 (diagrammatically indicated in FIGS. 3 and 4) and a collector shoe structure 92. The rear plate 94 of each support system 90 is mounted on a support 96, which in turn is secured, by a connecting bracket 98, to the axle assembly 44. Between rear support plate 94 and its cooperating front support plate 100 are mounted the linkage arms 102, 104, one of arms 102 having pivotally connected thereto a connecting rod 106, the other end of which is connected to an appropriate piston contained in a fluid actuated cylinder 108 pivotally mounted on support bracket 98.

Figure 5:
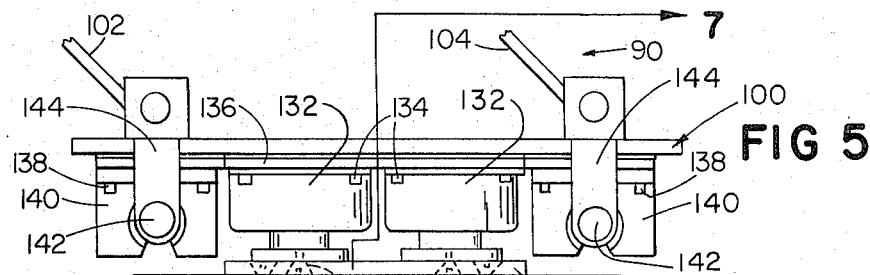
FIG. 5 is a top elevational view, partially broken away, of a power collector employed in the system shown in FIG. 1.
Figure 6:
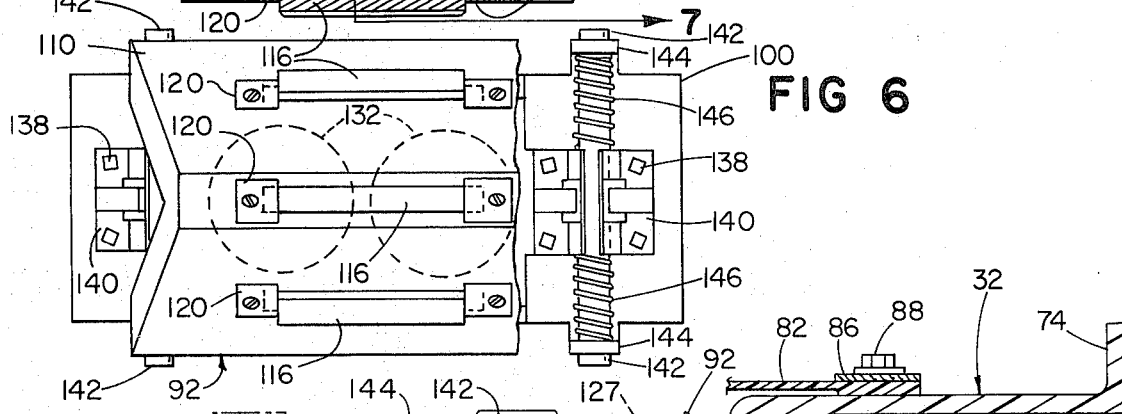
FIG. 6 is a side view, partially broken away, of the power collector of FIG. 5; and, FIG. 7 is an enlarged sectional view of the power collector of FIG. 5, taken along the line 7—7, together with an engaged power source.
Figure 7:
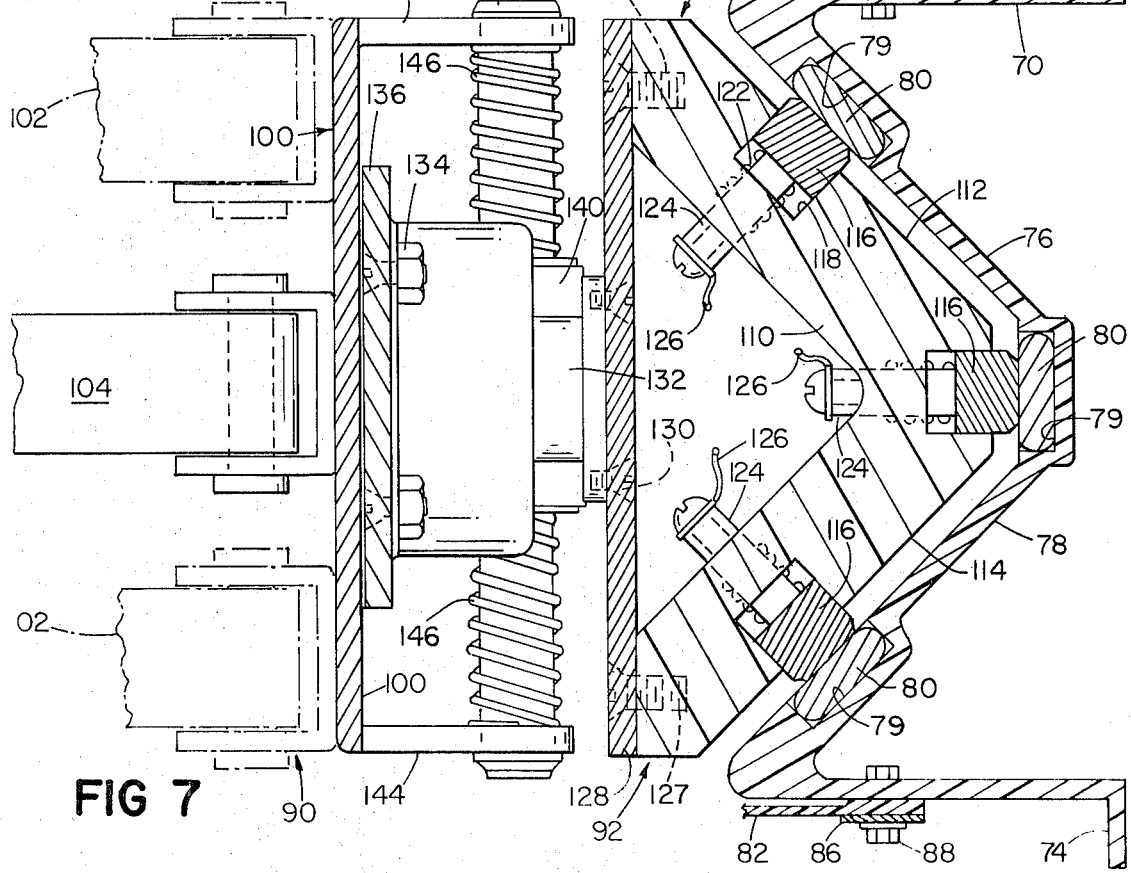

Referring now to FIGS. 5-7, each collector shoe structure 92 has a tapered head 110, formed of electrical insulating material such as a fiber reinforced polyester of which the two outer surfaces 112,114 are disposed to one another at a 90° angle. Three parallel contact members or conductor bars 116 are each received in corresponding recesses 118. Each bar 116 is held in place by clamp blocks 120 and biased outwardly by springs 122 so as to project through the head beyond surfaces 112, 114. Rearwardly extending studs 124 provide terminals for connection of cables 126 to the vehicle's electrical system. The distances between the adjacent conductor bars, and their locations on head 110 correspond to the distances between and the location of the bars 80, respectively, in power source base 70. Thus, positioning of power collector head 92 with power source structure 32 results in electrical engagement of substantial surface areas of the conductor bars 116 with the adjacent bus bars 80 providing good electrical connection therebetween, as shown in FIG. 7.

To provide for easy, rapid alignment between each conductor bar 116 and the respective bus bar 80, resilient connections are provided between each head 92 and its pantograph support system 90. The collector head 92 is secured by fasteners 127 to a head support plate 128 which is in turn secured by fasteners 130 to mounts 132. Mounts 132 are in turn secured by fasteners 134 to support plate 136. Secured to each end of plate 136 by fasteners 138 is a pillow block 140 that receives a support shaft 142. Each support shaft 142 is secured between a pair of brackets 144 which project from pantograph plate 100. Springs 146 allow vertical movement of each pillow block 140 and plate 136 as a unit relative to brackets 144 and thus vertical movement of the collector head 92 relative to its pantograph system 90. Springs 146, being equally sized, also tend to center each pillow block 140 on the respective shaft 142. The mounts 132 allow resilient twisting movement of each head 92 about axes parallel and (horizontally) perpendicular to the direction of rail 32. Thus a threefold resilient support system is provided for each conductor bar by springs 122, mounts 132, and springs 146.

In operation, during travel of the vehicle along the roadway, one or the other of the cylinders 108 is actuated so as to cause either power collector head 92a or 92b to engage the respective power rail 32a or 32b. Consider the vehicle 10a approaching the junction 18 of FIG. 1. Its steering mechanism is biased so that one of its follower wheels 60 is in engagement with guide member 30a or 30b and its power collector 14 is slidably engaged with power rail 32b to provide vehicle power. The engaged power rail may conveniently be, but need not be, on the same support member 26 or 28 as carries the then utilized guide follower rail 30. If the vehicle 10a is to follow vehicle 10b, its follower wheel 60b must be biased against follower rail 30b, and power collector 14 continues to engage the power rail 32b.

However, if vehicle 10a is to follow vehicle 10c, it is necessary not only that the vehicle switch be actuated to bias follower wheel 60a into engagement with guide rail 30a, but also that power collector 12 be engaged with the power rail 32a. To accomplish this, appropriate switching means responsive, for example, to a fixed junction indicator causes the proper power collector to engage its corresponding power rail. (At such switching point, as indicated above, the cover members 80 are omitted—or suitably modified—to permit ready engagement of the collectors with the power rails.) Such switching may be actuated, e.g., in accordance with a directional program set for the vehicle when it enters the roadway system. Thus the switching is done automatically and no manual steering or manual activation of the in-vehicle switching mechanism of the vehicles is necessary. To switch power collectors, the direction of fluid pressure in each cylinder 108 is reversed, so that one pantograph linkage 90 is extended and the other retracted, thereby inserting the collector head of collector 14 into the groove of its power rail 32b before the junction (avoiding interruption of power to the vehicle).

The nesting configurations of each collector head 92 and power rail 32, in cooperation with the resilient support for head 92, results in automatic alignment of the collector head and the respective power rail, and rapid and independent electrical connection for power transfer between each bus bar and the respective conductor bar. Such rapid electrical switching ability also permits ready alteration capability of a desired vehicle path past a junction. In addition, the spring-biased conductors and the fluid pressure biasing maintain constant, steady electrical connection between the power rail 32 and collector head 92 even during minor surface irregularities.

If the steering system is also fluid actuated (by a hydraulic or pneumatic system) the power collector cylinders may be operated coordinately with the steering control. Thus, as the bias is shifted from one guide wheel 60 to the other, so, too, is the engaged power collector head 92 shifted.

While the system has been described for road vehicles, it is of course suitable for other power-driven vehicles, and for overhead or under power rails, as well as the illustrated horizontal rails. Also, although there are two continuous power sources 32 shown, it should be understood that along most roadway stretches only one power source need be provided, two being necessary only at junction. The rapid switching and engaging ability of the disclosed power collectors enables shorter duplicated power sources to be used.

Other embodiments will occur to those skilled in the art and are within the following claims.

What is claimed is:

1. A transportation system comprising a vehicle utilizing electrical power, a predetermined vehicle path, a power source extending along said path, a power collector electrically connectible to said power source for providing continuing power transfer between said power source and said vehicle, and coupling structure mounting said power collector on said vehicle, said power source comprising structure defining an elongated open sided channel located to receive said power collector, said channel having opposed inside surfaces which extend inwardly toward one another from the open side of the channel and power carrier structure exposed in said channel, said power carrier structure including a continuous electrical conductor extending along each said inside surface, said continuous electrical conductors being disposed parallel to one another in opposed relation on opposite sides of said channel, said power collector including an elongated head having outside surfaces generally conforming to the inside surfaces of said power source, and tapering toward the leading end of said head, and power receiver structure exposed through each of said outside surfaces of said head, said head and said channel being sized and structured so that said head may be inserted into and retracted through said open side of said channel at any point along the length of said channel, said outside surfaces of said head, when inserted in said channel, being received for guided engagement with said inside surfaces of said channel as said vehicle moves along said path with said power receiver structure in electrical contact with said electrical conductor to transfer electrical energy from said power source to said vehicle, and said coupling structure comprising retractor means for selectively inserting said power collector into guided engagement with said channel and retracting said power collector from said channel, and resilient coupling means between said vehicle and said power receiver structure constructed to permit relative movement between said power receiver structure and said vehicle during insertion of said power collector head into said channel.

2. The system of claim 1 wherein said power receiver structure comprises at least one electrically conductive contact member, mounted in said head, having a contact surface exposed through said head, and spring means biasing said contact member to protrude past the surrounding outside surface of said head.

3. The transportation system of claim 1 wherein said power carrier structure comprises a plurality of fixed parallel continuous conductors, spaced apart from one another by electrical insulating material, at least one conductor being located in each of said inside surfaces, and said power collector comprises an identical plurality of contact members, spaced apart from one another by electrical insulating material, and located for concurrent independent electrical engagement with said conductors when said head is inserted in said channel.

4. The system of claim 1 wherein said coupling means comprises spring structure between said retractor means and said head permitting relative movement of said head in a direction perpendicular both to said predetermined vehicle path and to the direction of movement of said head by said retractor means.

5. The system of claim 4 wherein said coupling means comprises a first mounting member secured to said retractor means, and a second mounting member secured to said head, and slidably secured on said first mounting member, and said spring structure is located between said mounting members along said direction of relative movement.

6. A transportation system comprising a vehicle utilizing electrical power, a predetermined vehicle path, a power source extending along said path, a power collector electrically connectible to said power source for providing continuing power transfer between said power source and said vehicle, and coupling structure mounting said power collector on said vehicle, said power source comprising structure defining an elongated open sided channel located to receive said power collector, said channel having opposed inside surfaces which taper inwardly toward one another from the open side of the channel, and power carrier structure exposed in said channel, said power collector including a head having outside surfaces generally conforming to the inside surfaces of said power source, and tapering toward the leading end of said head, and power receiver structure exposed through said head, said head and said channel being sized and structured so that said head may be inserted into and retracted through said open side of said channel at any point along the length of said channel, said head, when inserted in said channel, being received for sliding engagement in said channel as said vehicle moves along said path with said power receiver structure in electrical contact with said power carrier structure to transfer electrical energy from said power source to said vehicle, and said coupling structure comprising retractor means for selectively inserting said power collector into said channel and retracting said power collector from said channel, and resilient coupling means between said vehicle and said head permitting relative movement of said head in a direction perpendicular to both said predetermined vehicle path and to the direction of movement of said head by said retractor means comprising a first mounting member secured to said vehicle, a second mounting member secured to said head, and resilient means located between said mounting members permitting said movement of said head relative to said vehicle path and to the direction of movement of said head by said retractor means, and resilient support means between said second mounting member and said head, permitting angular movement of said head relative to said vehicle.

7. A transportation system comprising a vehicle utilizing electrical power, a predetermined vehicle path, power source structure extending along said path, said power source comprising two elongated open sided channel defining structures, each of which extends along said predetermined vehicle path, one on one side of said vehicle path and the other on the other side of said vehicle path, the open side of each channel facing toward said vehicle path and each said channel having opposed inside surfaces which extend inwardly through one another, and power conductor structure exposed in each said channel, two power collector head structures electrically connectible to said power source for providing continuing power transfer between said power source and said vehicle, each said power collector head structure being arranged for engagement with a respective one of said channel defining structure with at least one of said channel defining structures having a power collector head engaged therewith throughout travel of said vehicle along said predetermined vehicle path, each said power collector head structure having outside surfaces that generally conform to the inside surfaces of said channels and taper toward the leading end of said head, and contact structure protruding past said outer surfaces of said head, said head and said channel being sized and structured so that said head may be inserted into and retracted through said open side of said channel at any point along the length of said channel, said outside surfaces of said head, when inserted in said channel, being received for guided engagement with said inside surfaces of said channel as said vehicle moves along said path with said contact structure in electrical contact with said power conductor structure to transfer electrical energy from said power source to said vehicle, and two coupling structures mounting said power collector head structures on opposite sides of said vehicle, each said coupling structure comprising means for selectively inserting its power collector head structure into guided engagement with said channel and retracting said power collector head structure from said channel, resilient coupling means between said vehicle and said contact structure constructed to permit relative movement between said contact structure and said vehicle during insertion of said power collector head into said channel, and resilient support means between said vehicle and said power collector head permitting angular movement of said head relative to said vehicle.

8. The system of claim 7 wherein said channel defining structures diverge from one another at a junction with only one of said channel defining structure extending along the predetermined vehicle path past said junction, and said system includes first retractor means operable to engage one of said power collector heads with its corresponding channel defining structure, and second retractor means operable to disengage the other power collector head from the other said channel defining structure.

9. The system of claim 7 wherein said vehicle includes road wheels, and said power collector heads are located adjacent and outside of said wheels.

10. The system of claim 1 wherein said conductors have exposed surfaces substantially coplanar with the said inside surfaces of said channel.

11. The system of claim 10 and further including cover means including two flexible sheet members of electrical insulating material disposed in shingled relation across said open side of said housing.

12. The system of claim 1 and further including a third conductor located at the innermost end of said channel, substantially midway between said inside surfaces.

13. An electrically powered vehicle adapted to receive power continuously from a power source extending along a predetermined vehicle path comprising
a body, electrical propulsion means carried on said body,
a power collector connected to said electrical propulsion means adapted for sliding engagement with a continuous power source extending along a predetermined vehicle path, and comprising an elongated tapered head having two opposed outer surface portions disposed at an angle to one another, each said outer surface portion being adapted to engage a corresponding surface of said continuous power source for aligning said head relative to said continuous power source and three electrically conductive members, two of said members being disposed adjacent respective ones of said outer surface portions and the third electrically conductive member being disposed adjacent the intersection of said two outer surface portions, each said electrically conductive member having an exposed contact surface for electrical connection to said power source, and
coupling structure mounting said power collector on said vehicle body, said coupling structure comprising retractor means for selectively inserting and retracting said power collector relative to said power source, and resilient coupling means between said vehicle body and said head, said resilient coupling means between said vehicle body and said head including a first mounting member secured to said vehicle body, a second mounting member secured to said head, resilient means located between said mounting members permitting relative movement of said head in a direction perpendicular to both said vehicle path and to the direction of movement of said head by said retractor means, and resilient support means between said second mounting member and said head, permitting angular movement of said head relative to said vehicle body.

14. The vehicle of claim 13 wherein said conductive members are mounted in said head and resilient means bias said members to protrude past the adjacent outside surface of said head.

15. The vehicle of claim 13 wherein said resilient coupling means comprises spring structure between said vehicle body and said head permitting relative movement of said head in a direction perpendicular both to said predetermined vehicle path and to the direction of movement of said head by said retractor means.

16. The vehicle of claim 15 wherein said coupling means comprises a first mounting member secured to said retractor means, and a second mounting member secured to said head, and slidably secured on said first mounting member, for movement relative to said first mounting member, and said spring structure is located between said mounting members along said direction of relative movement.

17. The vehicle of claim 13 wherein said retractor means comprises a pantograph linkage having one side secured to said vehicle, the opposite side resiliently coupled to said head, and arms facing said sides, and drive means for selectively expanding and contracting said linkage.

18. The vehicle of claim 17 wherein said drive means includes a fluid actuated piston assembly mounted on said vehicle, having a fluid actuated piston rod secured to one of said arms.

19. An electrically powered vehicle adapted to receive power continuously from one of two power sources that extend along a predetermined vehicle path comprising
a body, electrical propulsion means carried on said body,
two power collectors, each connected to said electrical propulsion means and each arranged for sliding engagement with a respective one of said power sources, and each capable of independently receiving power sufficient for said vehicle, each said power collector comprising an elongated tapered head having two opposed outer surface portions disposed at an angle to one another, each said outer surface portion being adapted to engage a corresponding surface of said continuous power source for aligning said head relative to said continuous power source and three electrically conductive members electrically isolated from one another for engaging separate conductors of a said power source, two of said members being disposed adjacent respective ones of said outer surface portions and the third electrically conductive member being disposed adjacent the intersection of said two outer surface portions, each said electrically conductive member having an exposed contact surface for electrical connection to said power source, and
coupling structure mounting said power collector on said vehicle body, said coupling structure comprising retractor means for selectively inserting and retracting said power collector relative to said power source, and resilient coupling means between said vehicle body and said head.

20. The vehicle of claim 19 and further including switch means carried by said vehicle including follower means for sensing fixed guide means extending along said predetermined vehicle path, said follower means having first and second operating modes enabling said vehicle to select one of two alternate paths at a junction of said predetermined vehicle path and means engaging one of said power collectors with a cooperating power source and disengaging the other power collector from its cooperating power source in coordination with switching of said follower means from one operating mode to another.

21. The vehicle of claim 20 including road wheels, wherein said power collectors are located on opposite sides of said vehicle and outside of said road wheels.

* * * * *

UNITED STATES PATENT OFFICE
CERTIFICATE OF CORRECTION

Patent No. 3,786,762　　　　　Dated January 22, 1974

Inventor(s) James L. Corkum et al.

It is certified that error appears in the above-identified patent and that said Letters Patent are hereby corrected as shown below:

Column 5, line 55, "activation" should be --actuation--.

Column 6, line 23, "junction" should be --junctions--.

Column 8, line 25, "through" should be --towards--.

Signed and sealed this 11th day of June 1974.

(SEAL)
Attest:

EDWARD M. FLETCHER, JR.
Attesting Officer

C. MARSHALL DANN
Commissioner of Patents